Figures 1, 2:
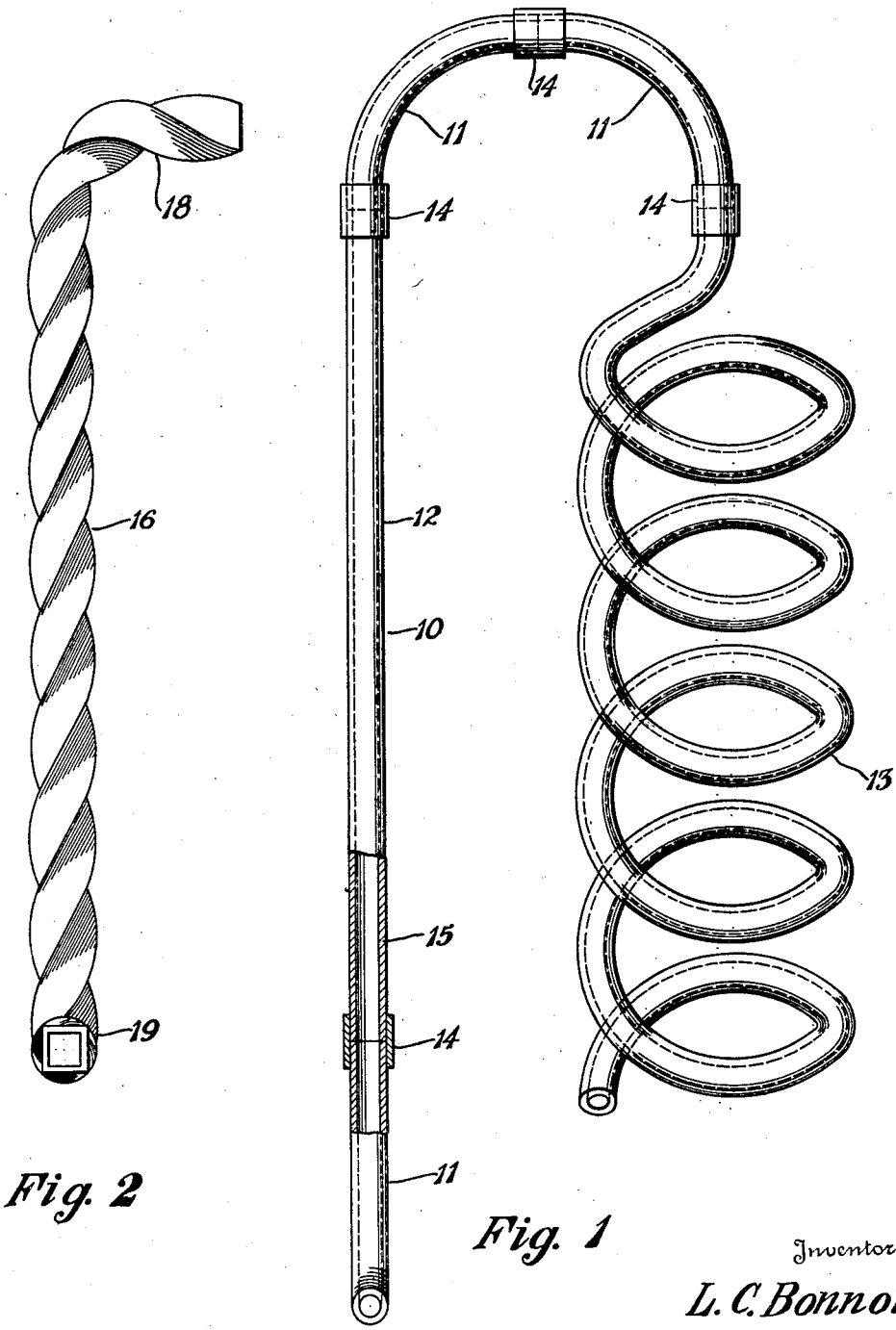

Jan. 8, 1935. L. C. BONNOT 1,987,358
METHOD AND APPARATUS FOR PLASTIC MATERIAL MANUFACTURE
Filed Sept. 6, 1932 6 Sheets-Sheet 1

Inventor
L. C. Bonnot
By Frease and Bishop
Attorneys

Jan. 8, 1935. L. C. BONNOT 1,987,358
METHOD AND APPARATUS FOR PLASTIC MATERIAL MANUFACTURE
Filed Sept. 6, 1932 6 Sheets-Sheet 2
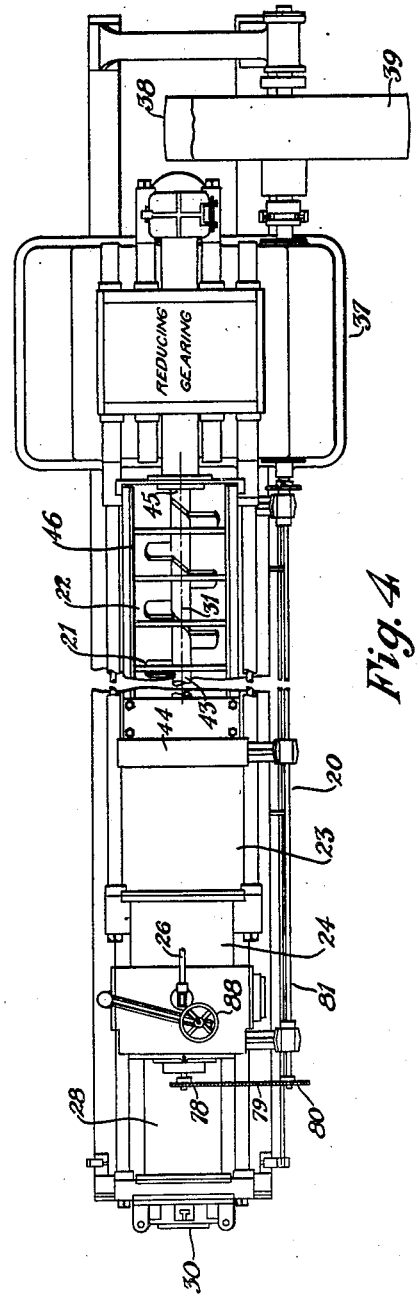
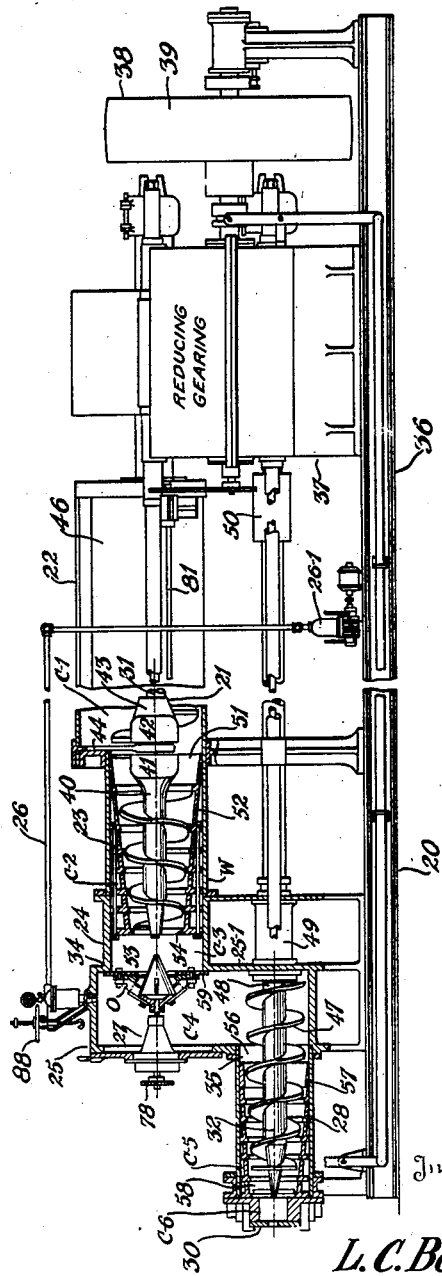
Inventor
L. C. Bonnot
By Frease and Bishop
Attorneys Jan. 8, 1935.  L. C. BONNOT  1,987,358
METHOD AND APPARATUS FOR PLASTIC MATERIAL MANUFACTURE
Filed Sept. 6, 1932   6 Sheets-Sheet 3
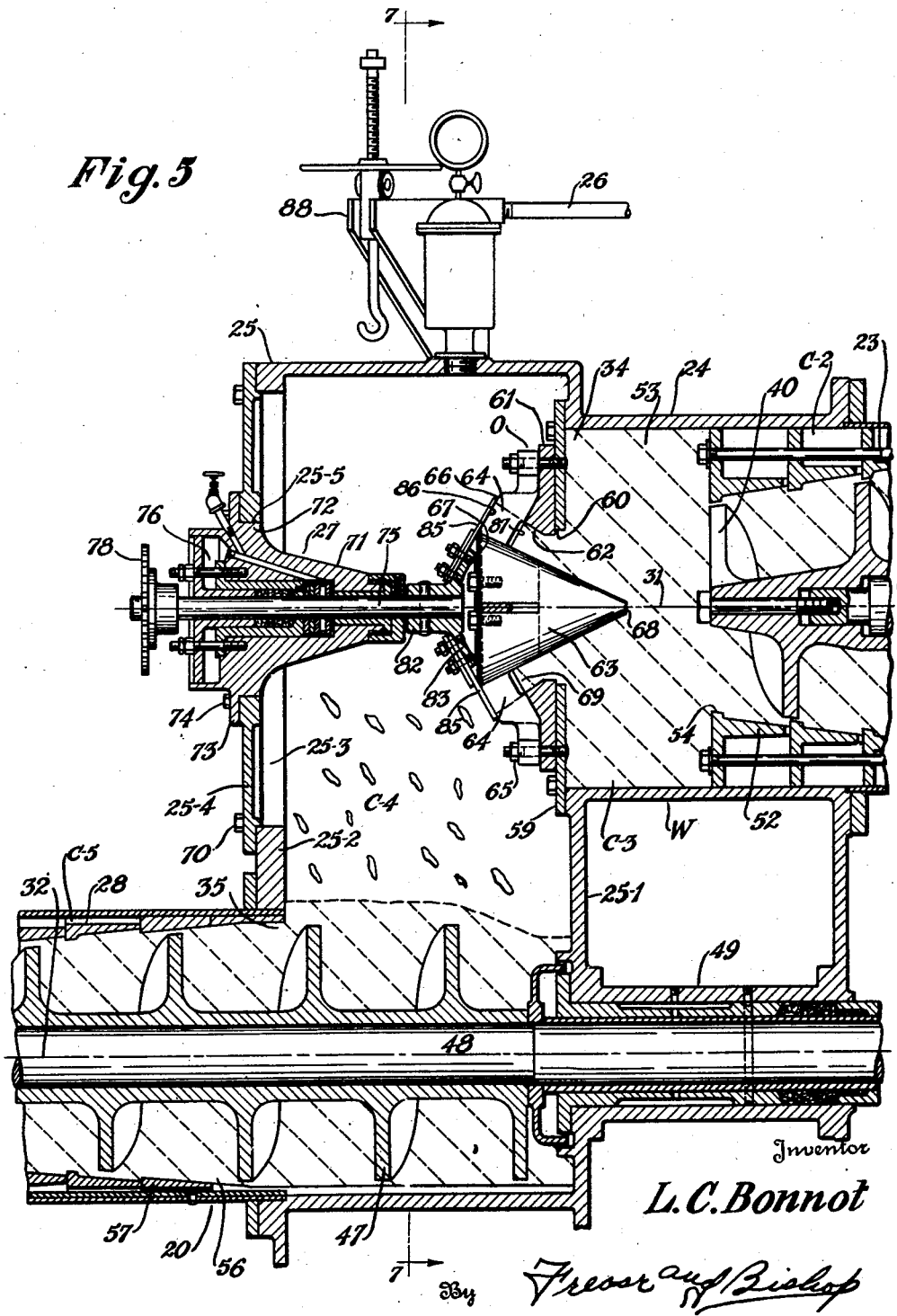

Jan. 8, 1935. L. C. BONNOT 1,987,358
METHOD AND APPARATUS FOR PLASTIC MATERIAL MANUFACTURE
Filed Sept. 6, 1932 6 Sheets-Sheet 5

Inventor
L. C. Bonnot
By Frease and Bishop
Attorneys

Jan. 8, 1935.    L. C. BONNOT    1,987,358
METHOD AND APPARATUS FOR PLASTIC MATERIAL MANUFACTURE
Filed Sept. 6, 1932    6 Sheets-Sheet 6

Inventor
L. C. Bonnot
By Frease and Bishop
Attorneys

Patented Jan. 8, 1935

1,987,358

UNITED STATES PATENT OFFICE 1,987,358

METHOD AND APPARATUS FOR PLASTIC MATERIAL MANUFACTURE

Louis C. Bonnot, Louisville, Ohio, assignor to The Bonnot Company, Canton, Ohio, a corporation of Ohio Application September 6, 1932, Serial No. 631,808

8 Claims. (Cl. 25—1)

The invention relates to methods and apparatus for use in the manufacture of products of plastic materials, and more particularly for use in the manufacture of products of ceramic materials such as clays, shales, and mixtures of the same, and the manufacture of which includes forming by any desired means, units from a plastic mass of the material, drying the units, and then usually firing the units to make the finished burned ceramic products.

The invention also relates to methods and apparatus for use in the manufacture of units from plastic materials, such as certain clays, shales, and mixtures of the same, and such as Portland cements, and the manufacture of which includes forming by any desired means, units from a plastic mass of the material, and then drying and hardening the formed units directly in the air or atmosphere without requiring firing.

More particularly the invention relates to methods and apparatus for use in the manufacture of products of plastic materials, and more particularly as aforesaid for use in the manufacture of products of ceramic materials, such as clays, shales, and mixtures including the same, and the manufacture of which includes forcing or extruding a tempered or moistened plastic mass of such a material through a die and thus forming a longitudinally extending green column of the plastic material, the cross section of the column having different dimensions and shapes for different purposes, and the column being then severed into the units, which are subsequently dried, and are then fired to make finished burned ceramic products, or air dried or hardened as aforesaid.

Prior to the availability of methods and apparatus of the type of the present invention, extruded unit products manufactured as aforesaid from such plastic material of any particular composition, such as a particular clay, or a particular mixture of clays, have been subject to certain dimensional limitations, which may be classified as follows:

(1) The maximum length of a unit has been limited both with and without respect to its transverse cross sectional area and the minimum dimension of its cross sectional area;

(2) The minimum transverse cross sectional area of a unit and the minimum dimension of the cross sectional area have been limited both with and without respect to its length; and (3) In the case of tubular or hollow products such as building tile, drain tile, conduits and the like, the minimum wall thickness of a unit has been limited both with and without respect to the over all transverse cross sectional area of the unit, and with and without respect to the length of the unit.

The foregoing dimensional limitations have arisen from the fact that the bodies or walls of extruded green columns and thus of the units severed from the columns have not been self-sustaining throughout processing, when the unsupported columns or units severed from the columns have had dimensions contrary to the limits determined by experiment for the particular plastic material being processed.

It is necessary that green columns or units made from plastic material be self-sustaining in order that the subsequent drying and/or burning operations and the intervening handling operations may be carried out.

From the standpoint of length, it is desirable that the finished units be as long as possible for many reasons, the more important of which are to facilitate transporting and handling the units, to facilitate installing and/or joining the units at the place of use, and to minimize maintenance requirements for the joints between the units.

With particular reference to piping, the use of extruded ceramic piping has been practically prohibited, prior to the availability of methods and apparatus of the type of the present invention, because the relatively short lengths of tubular ceramic products heretofore made by processes including extrusion, would not only involve an excessive cost of installation, but would also result in extreme difficulty in avoiding leakage, by reason of the multiplicity of joints or connections which would be required between the ends of such relatively short units.

From the standpoint of transverse cross sectional area as well as from the standpoint of wall thickness of tubular products, it is desirable that such dimensions be a minimum, in order to reduce the weight of the units and thus reduce substantially all costs connected with the making and using of the units.

In addition to the aforesaid dimensional limitations, prior to the availability of methods and apparatus of the type of the present invention, extruded unit products made from plastic materials have been subject to form limitations, which have generally precluded the manufacture of any form except a longitudinally straight unit.

In other words it has rarely been possible prior to the availability of methods and apparatus of the type of the present invention to make a bent, a twisted, or a bent and twisted extrusion product from plastic material such as clays, shales, and mixtures including the same, or such as Portland cements, because the usual longitudinally extending green column, or unit severed therefrom, cannot be displaced laterally from its longitudinally straight formation, without collapse of the body, wall, or walls of the column or unit.

From the standpoint of providing bent, twisted, or bent and twisted extruded ceramic products, and particularly bent, twisted, or bent and twisted extruded tubular ceramic products, such products, hitherto not available, are very desirable for use in pipe systems particularly, in the chemical, metallurgical, and processing industries, for insulation purposes either with respect to heat or electricity, and for conduits.

It is desirable to provide a unit which is bent or curved by having its longitudinal axis in a single plane, and having its body bent about an axis at right angles to the plane of the longitudinal axis, so as to form for example a pipe elbow.

It is also desirable to provide a unit which is twisted by having its body twisted about its longitudinal axis, as for example to form elongated ornamental units of square or rectangular cross sections.

It is also desirable to provide a unit which is bent and twisted, as for example to form a tubular coil either spiralled or helixed, for use as a condenser or heat transfer unit.

Many different reasons have been advanced for the aforesaid dimensional and form limitations heretofore encountered in the manufacture of products or articles of manufacture from such materials as the ceramic or fire hardening materials, such as clays, shales, and mixtures including the same, or the air hardening materials, which include some clays, shales, and mixtures including the same, as well as Portland cements.

All of such plastic materials may be termed heterogeneous plastic materials, because each comprises a mixture of solids, liquids, and gases, and the gases may or may not be that mixture of gases ordinarily called air, and it has become generally accepted that the gas content of such materials is one of the most important causes of the aforesaid dimensional and form limitations.

Heretofore by aging or tempering treatments, there has been effected a limited reduction in the ratio between the mass of gas or gases, and the mass of liquids and solids in any unit mass of such a heterogeneous plastic material.

The term homogenizing may be said to indicate any treatment which effects a greater reduction in the ratio between the mass of gas or gases, and the mass of liquids and solids in any unit mass of such a heterogeneous plastic material, than is effected by the usual aging or tempering treatments.

Likewise, such a heterogeneous plastic material may be said to be homogenized when the ratio between the mass of gas or gases, and the mass of liquids and solids in any unit mass of the heterogeneous plastic material, is less than the ratio would be if the material had been subject to the usual aging or tempering treatments.

Such a heterogeneous plastic material may be said to be highly homogenized when the gas content of the same has been substantially eliminated by any suitable treatment.

Homogenizing of plastic material may be carried out by the use of apparatus which in general may include a pug mill or feeder barrel adapted to receive through an upper opening therein in a usual manner, the particular plastic material to be homogenized.

The pug mill or feeder barrel preferably communicates with a screw extrusion press which delivers the pugged or tempered plastic material from the pug mill or feeder barrel into a first sealing cylinder where a first seal plug of the compressed material is formed, and from which the compressed material is introduced into a vacuum chamber, the gas content of which is continuously pumped away as through a pipe line connected with a suitable pump, so that the pressure in the vacuum chamber is continuously maintained at preferably from 21 to 26 inches or higher of mercury.

Before entering the vacuum chamber, the tempered plastic material preferably passes through a comminuting apparatus located between the vacuum chamber and the first sealing cylinder.

The vacuum chamber preferably communicates with means which may include a screw extrusion press, where the final step of the homogenizing operation is completed by compressing and forming a second seal plug of the plastic material, the gas content of which has been reduced by comminution or shredding of the same as it passes into and through the vacuum chamber.

The homogenized plastic material is then preferably extruded through a die which may have any desired transverse cross sectional area, and the homogenized plastic material is delivered from the extrusion die as a green column, which may be in final form or may be subsequently processed as may be desired.

In general, products made of homogenized plastic material are not subject to the aforesaid dimensional and form limitations. From a standpoint converse to that of dimensional and/or form limitations, the usual specifications as to the strength of any particular product may be met by the use of a lesser wall thickness for the product when the same is made of homogenized plastic material, than the wall thickness required when the product is made by the use of unhomogenized plastic material.

It has been discovered that the beneficial results of homogenizing plastic material are best attained the higher the degree of homogenization of the material.

The objects of the present invention include, therefore, in general the improvements of methods and apparatus of the foregoing type, so that by the use of the improved methods and apparatus heterogeneous plastic material may be homogenized to a maximum degree, whereby products may be made therefrom which are not subject to the aforesaid dimensional, form, and/or strength limitations.

Some of the improved products, which have been made by the use of the present improved methods and apparatus, have heretofore been set forth in my application for U. S. Letters Patent for Products of plastic material, Serial No. 610,422, filed May 10, 1932, and certain improved methods of making certain of said products including the use of some of the present improved methods and apparatus have heretofore been set forth in my application which has matured on October 17, 1933, in U. S. Letters Patent No. 1,931,371 for Plastic material manufacture.

Certain particular objects of the present invention include, therefore, the improvement of the methods and apparatus of the foregoing general type, whereby plastic material processed by the use of the present improved methods and apparatus is produced in the form of an elastic or rubbery highly homogenized mass having physical characteristics which permit the improved products of said prior application Serial No. 610,422 to be made therefrom, and which permit the improved methods of said Patent No. 1,931,371 to be carried out.

From the standpoint of productive, or volume capacity, the operation of a complete plant equipped with production machinery for manufacturing products of plastic materials, and particularly products of ceramic materials, such as clays, shales, and mixtures of the same, require that each component apparatus unit or machine, or group of apparatus units or machines must have a volume capacity equal to that of each of the other component apparatus units or machines.

In large plants, the volume capacity of the plant as a whole, and consequently of each component apparatus unit or machine, may be as much as 50 tons per hour.

Prior to the present improvements or to the improvements of said other applications set forth herein, the commercial use of any homogenizing, vacuum, de-airing, or de-gasing process and/or apparatus has been prevented because the possible volume capacity of such processes and/or of the prior art has been inadequate.

Moreover, any commercially satisfactory homogenizing, vacuum, de-airing, or de-gasing process and/or apparatus, must be adaptable for use at the usual volume capacity of the other standard apparatus units or machines of the complete plant, when processing any or all of the several kinds of clays encountered in different localities, or used for making different kinds of products.

The different kinds of clays processed in commercial plants vary as to grog content, degree of fineness, and plasticity.

The prior art has suggested the use of slowly operating disintegrating or comminuting means in a vacuum chamber for facilitating the reduction of the gas content of the material passing therethrough.

No means or combination of means is however disclosed by the prior art, whereby with or without the slowly operating comminuting or disintegrating means of the prior art, a commercial volume capacity may be attained through the vacuum chamber, or whereby such required commercial volume capacity may be attained regardless of the kind of clays, shales, or other ceramic materials being processed.

From the standpoint of operating costs, any disintegrating or comminuting means used in connection with a vacuum chamber in an homogenizing process, must require a relatively slight amount of power for its operation, or the commercial use of the same will be prohibited.

Accordingly, other particular objects of the present invention furthermore include the improvement of the construction and arrangement of the detail parts of the apparatus of the foregoing general type, and particularly of the portions of the apparatus including the first sealing means, the vacuum chamber, the second sealing means, and the parts including the comminuting apparatus operative between the vacuum chamber and the first sealing cylinder, whereby the volume capacity of the apparatus as a whole is substantially the same as, or greater than, the volume capacity of similar apparatus not including homogenizing means, and also whereby the operation of the improved apparatus does not require a prohibitive increase in power over that necessary for the operation of similar apparatus not including homogenizing means.

The foregoing and other objects are attained by the methods, apparatus, parts, combinations, and sub-combinations, which comprise the present invention, and the nature of which is set forth in the following general statement, and preferred embodiments of which are set forth in the following description, and which are particularly and distinctly pointed out and set forth in the appended claims forming part hereof.

The nature of the improved method of the present invention may be stated in general terms as including isolating a mass of plastic material from the normal atmosphere, moving the isolated mass, compressing the isolated moving mass preferably into the form of a tube, expanding and longitudinally tearing the isolated compressed moving tubular mass, rapidly disintegrating or comminuting preferably by cutting or transversely tearing the expanded and longitudinally torn isolated moving tubular mass into relatively small expanded pieces or shreds preferably having rough outside faces, preferably simultaneously subjecting the expanded, torn, and comminuted pieces or shreds for a predetermined and relatively short period of time to an atmosphere isolated from the normal atmosphere and having a reduced pressure, preferably a vacuum of from 21 to 26 inches or higher of mercury, continuously moving said isolated atmosphere of reduced pressure away from the moving expanded, torn, and comminuted pieces or shreds to the normal atmosphere thereby reducing and pumping away the gas content of the expanded, torn, and comminuted pieces or shreds of plastic material, re-compressing the expanded, torn, and comminuted pieces or shreds of plastic material having a reduced gas content to form a highly homogenized mass of the plastic material, and then moving the highly homogenized mass of plastic material into the normal atmosphere.

The improved method hereof furthermore includes novel details as are hereinafter more fully set forth.

The nature of the improved apparatus of the present invention may be stated in general terms as including pressure sealed isolating walls forming a succession of communicating chambers, an inlet opening for the first chamber communicating with the normal atmosphere, and an outlet opening for the last chamber communicating with the normal atmosphere, the communicating chambers having operatively mounted therein and/or forming in the order named, a pug mill or feeder unit, a first compression unit preferably an extrusion screw press, a first plug seal forming chamber, a novel pressure relieving and preferably expanding and tearing orifice means, a vacuum chamber and preferably relatively high speed improved comminuting, disintegrating, shredding, cutting, or tearing means operative therein, re-compression means which may be in the form of a second extrusion press, a second plug seal forming chamber, and said inlet opening communicating with the pug mill or feeder unit, and said outlet opening preferably in the form of an extrusion die communicating with said second plug seal forming chamber.

Means are provided, preferably a vacuum pump operatively connected with the vacuum chamber, whereby the isolated atmosphere of the vacuum chamber is maintained at a reduced pressure, preferably a vacuum of from 21 to 26 inches or higher of mercury, and whereby said isolated atmosphere is continuously moved or pumped away from the vacuum chamber into the normal atmosphere.

Figure 6:
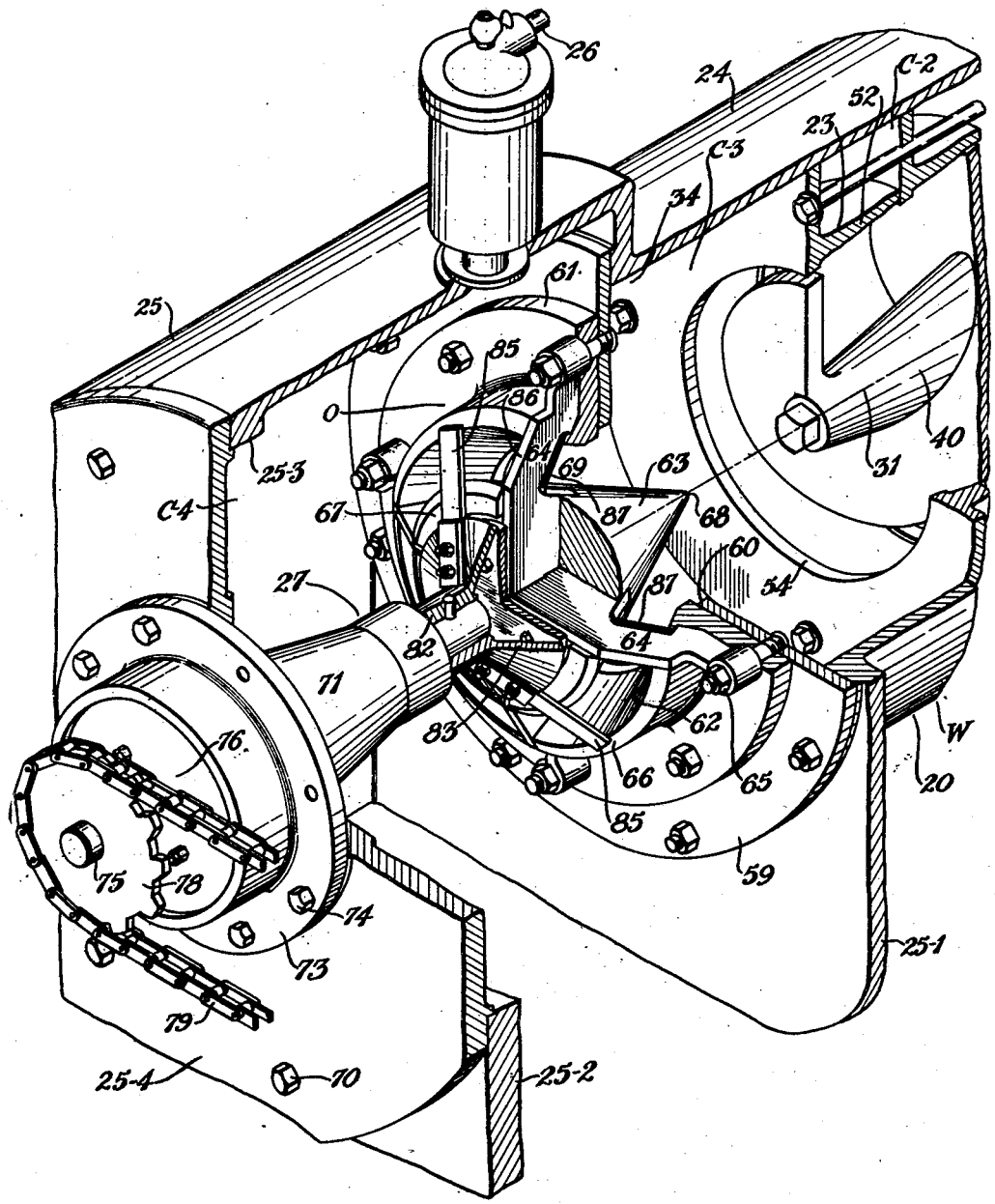
Figure 7:
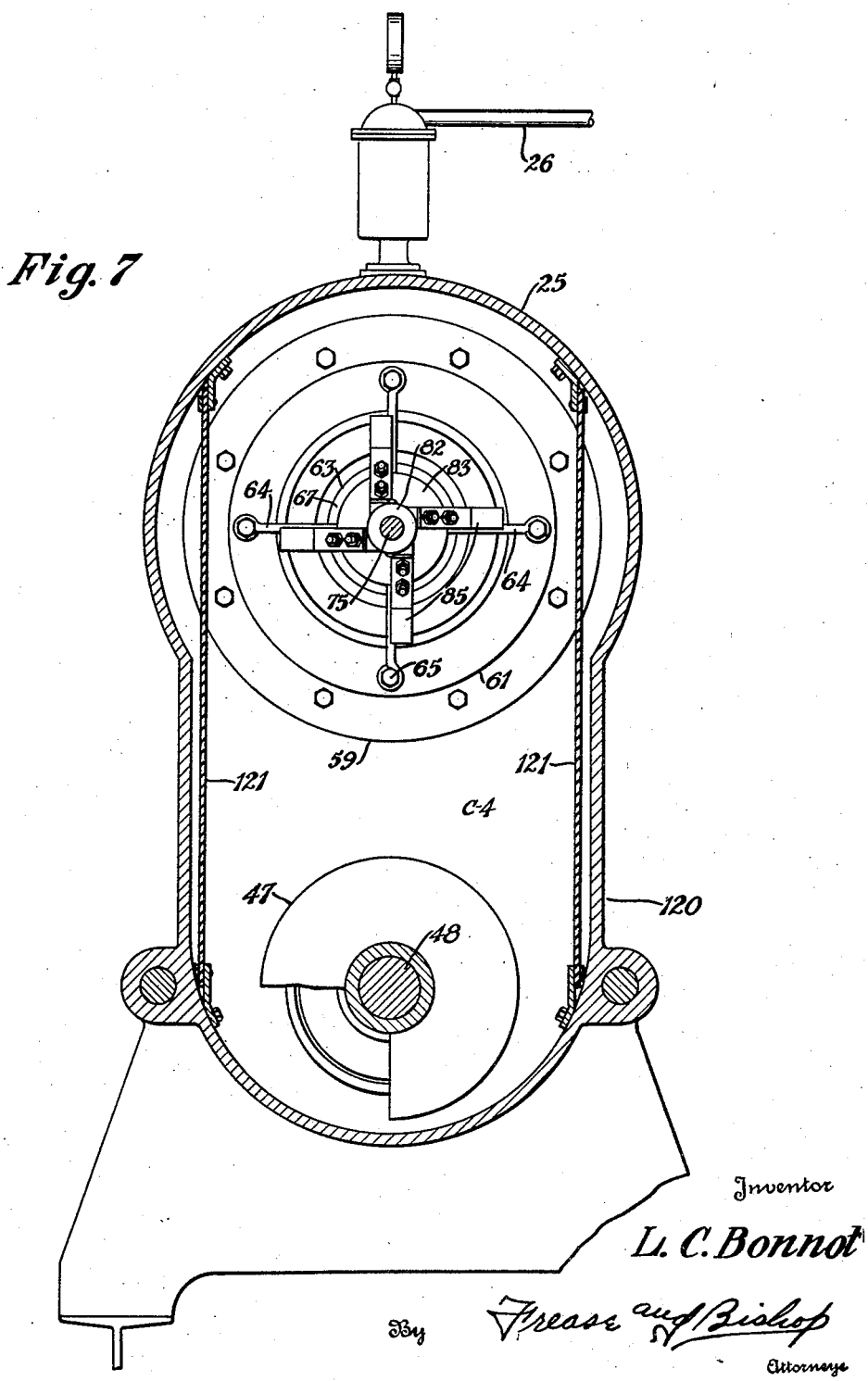
Figure 8:
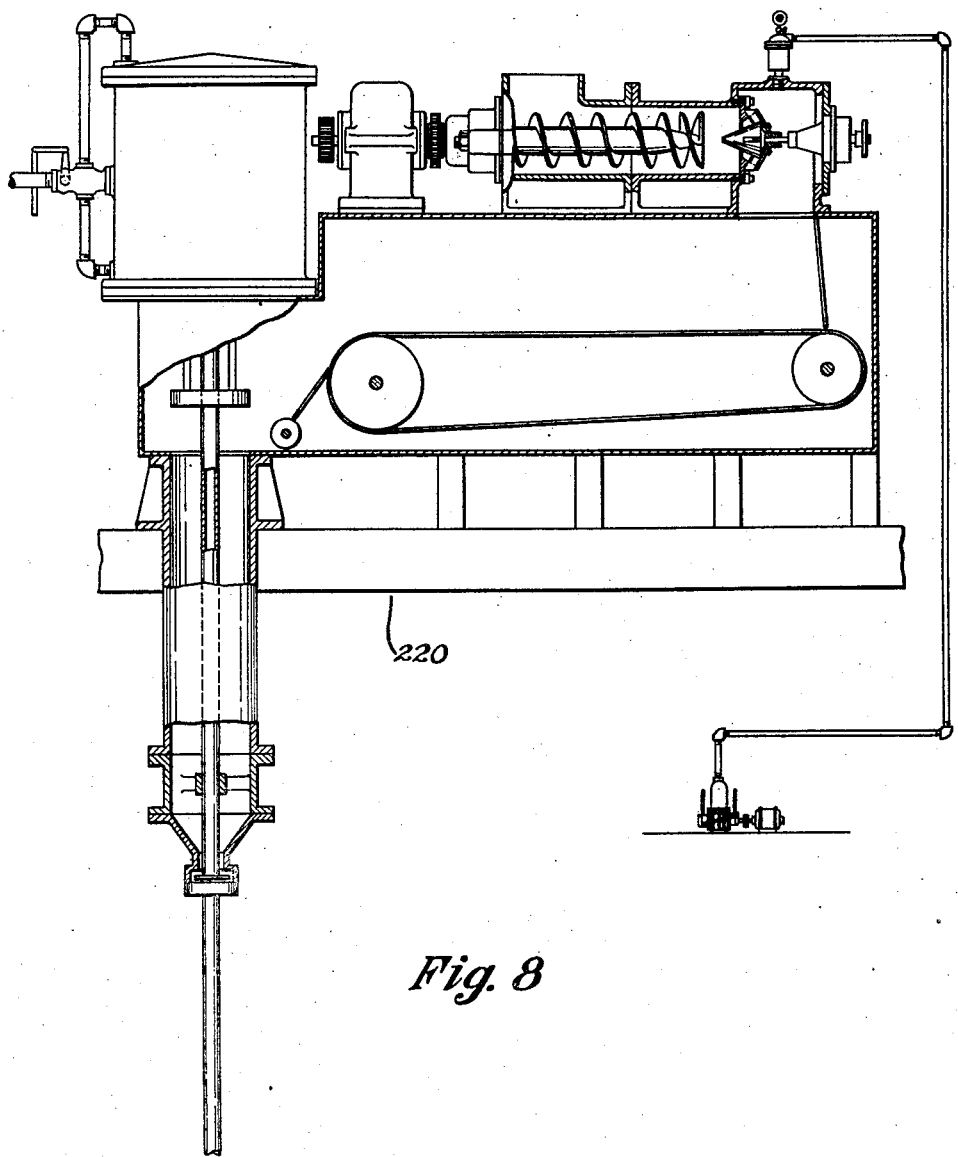

Typical embodiments of certain of the aforesaid improved products or articles of manufacture made by the use of the present improved methods and apparatus, and several preferred embodiments of the improved machine or apparatus, are illustrated in the accompanying drawings forming part hereof, in which Figure 1 is an elevation view with portions in section illustrating a piping system embodying said improved products made by the use of the improved methods and apparatus hereof;

Fig. 2, an elevation view with portions in section illustrating another form of twisted, and bent and twisted elongated member made by the use of the improved methods and apparatus hereof;

Fig. 3, a side elevation with portions in section illustrating one preferred embodiment of the improved machine or apparatus hereof adapted for carrying out the improved methods hereof;

Fig. 4, a top plan view thereof;

Fig. 5, an enlarged fragmentary view similar to Fig. 4 more clearly illustrating the details of construction of the present improvements;

Fig. 6, a fragmentary isometric view of the same;

Fig. 7, a transverse sectional view as on line 7—7, Fig. 5, illustrating a modified embodiment of the machine or apparatus of Figs. 3 to 6 inclusive; and Fig. 8, a fragmentary side elevation with portions in section illustrating another embodiment of the improved machine or apparatus hereof.

Similar numerals refer to similar parts throughout the drawings.

In Fig. 1, said improved products or articles of manufacture made by the use of the improved methods and apparatus hereof are embodied in the piping system indicated generally by 10 and which includes improved elbows 11, a length of improved straight pipe 12, and an improved helix coiled pipe 13 connected with each other as by means of sleeves 14.

The length of improved straight pipe 12 constitutes a tubular member formed of homogenized plastic material. The length of the straight pipe or tubular member 12 may be 48 inches and upwards; the outside transverse cross sectional area of the tubular member 12 may be less than 4 square inches; and the thickness of the tubular wall 15 of the member 12 may be substantially within the limits ⅛ inch and ₁⁄₁₆ inch.

The elbows 11 have the same outside transverse cross sectional areas as the straight pipe or tubular member 12, and the elbows 11 each constitutes a bent or curved tubular member formed of homogenized plastic material.

The helix coiled pipe 13 may be a heat exchange coil, and constitutes a tubular member having the same outside transverse cross sectional area as the straight tubular member 12 and the elbows 11, and being bent and twisted, or helix coiled, it being understood that to form any helix from a straight member requires bending and twisting of the straight member.

The particular dimensions of the above defined dimensional limitations of the improved products depend upon the particular plastic material from which the same are made.

For example, Ohio No. 5 fire clay was homogenized by the use of the present improved apparatus, and the transverse outside diameter of each of the circular tubular members 11, 12, and 13, was 1₁⁄₁₆ inches, and the tubular wall thickness of each of the tubular members was ₁⁄₃₂ inch, and the length of each of the members 11, 12 and 13 was over 48 inches.

Other tubular members have been made of fire clay homogenized by the use of the present improved methods and apparatus, and have had an outside transverse cross sectional circular area of 1½ inches diameter, and have had a wall thickness of ⅛ inch.

In Fig. 2 is illustrated a tubular member indicated generally by 16, and having a square cross section, and being twisted about its longitudinal axis, and being simultaneously bent or curved at its ends 18 and 19.

The tubular members 11, 12, and 13 comprise single tubular structures, but tubular structures including multiple tubes such as building or conduit tiles have been made according to the improved methods by the use of the improved apparatus hereof with suitable extrusion dies.

Likewise, elongated members having solid cross sections have been made of plastic materials homogenized by the use of the present improved methods and apparatus, and have had improved dimensional and form characteristics, and each of said elongated members having solid transverse cross sectional areas may have any desired length of 48 inches and upwards, and the minimum dimension of their transverse cross sectional areas may be when desired substantially within the limits ⅛ inch and ₁⁄₁₆ inch, and when desired the outside transverse cross sectional area of each member may be less than 4 square inches, and the members may be bent, twisted, or bent and twisted to substantially any desired form.

In any event in any elongated member of homogenized plastic material made by the use of the improved methods and apparatus hereof, the minimum dimension of the transverse cross sectional area of the homogenized member is less than the minimum dimension of the transverse cross sectional area of a member having the same strength and the same maximum dimension of its similar transverse cross sectional area as the homogenized member and made, if at all possible, from the same material in its unhomogenized state.

When the improved member is an elongated tubular member of homogenized plastic material, the foregoing minimum dimension is the thickness of the tubular wall of the homogenized member which is less than the thickness of the tubular wall of a tubular member having the same strength and the same inside transverse cross sectional area as the homogenized member and made, if at all possible, from the same material in its un-homogenized state.

In other words a substantial saving in weight of material is obtained by the improved products for any given duty and made by the use of the improved methods and apparatus hereof.

The improved products may also be made by the use of the improved methods and apparatus hereof, from material which is otherwise not available for use in making a particular product, that is to say certain clays hitherto not practically possible to be formed into tubular shapes, may be produced and have the characteristics of the improved products.

The present improved homogenizing apparatus, by the use of which said improved products may be made and the improved methods carried out, is indicated generally by 20.

The apparatus 20 includes pressure sealed isolating walls indicated generally by W and forming a succession of communicating chambers, and the communicating chambers have operatively mounted therein, and/or form, and/or are associated with, as is hereinafter set forth in detail, the several parts and/or means of the improved apparatus.

The first chamber C—1 has operatively mounted therein a pug mill 21 as illustrated, and the particular plastic material to be homogenized is introduced into the pug mill through the upper opening 22 of the first chamber C—1, which upper opening 22 communicates with the normal atmosphere.

The first chamber C—1, with the pug mill 21 operatively mounted therein, communicates with the second chamber C—2, wherein is operatively mounted a first compression unit preferably a screw extrusion press indicated generally by 23 and which compresses the pugged or tempered plastic material received from the pug mill 21 and delivers the compressed material into the first plug seal forming chamber C—3, as illustrated, formed by portions of the walls W comprising a sealing cylinder 24.

The plug seal forming chamber C—3 communicates with a vacuum chamber C—4 formed by portions 25 of the walls W, and a pipe line 26 connects the vacuum chamber forming wall portions 25 with a pump 26—1, whereby the pressure in the vacuum chamber C—4 may be continuously maintained at preferably from 21 to 26 inches or higher or mercury, by operation of the pump 26—1.

The communication between the first plug seal forming chamber C—3 and the vacuum chamber C—4 is preferably effected through novel pressure relieving and preferably tube forming, expanding and tearing orifice means indicated generally by 0, and preferably in the vacuum chamber C—4, an improved comminuting, disintegrating, shredding, or tearing apparatus indicated generally by 27 is operatively mounted as will hereinafter be set forth in detail.

The vacuum chamber C—4 communicates with the next chamber C—5 wherein is operatively mounted re-compression means which as illustrated are in the form of a second extrusion press 28, which serves to re-compress into a homogenized plastic mass, the pieces or shreds of plastic material of which the gas content has been reduced by the action of the prior parts and means of the apparatus.

The chambers C—5 communicate with a second plug seal forming chamber C—6, which is the last of the series of successive isolated communicating chambers, and which has an outlet opening communicating with the normal atmosphere, preferably in the form of an extrusion die 30, and which preferably forms the desired transverse cross sectional area of the green column of highly homogenized plastic material.

The homogenized green column is then severed to make self-sustaining straight green members such as the straight tubular member 12; or the green column, which has unusual elastic or rubbery characteristics, may be bent, twisted, or bent and twisted, to form in the green state the self-sustaining bent members 11, or the self-sustaining bent and twisted members 13, and 16, or otherwise further formed to substantially any desired configuration.

The improved members, such as 11, 12, 13, and 16, when made of ceramic materials requiring firing, are then dried in the usual manner, and fired; or when made of air hardening materials the improved members are permitted to air harden in a usual manner.

Instead of further forming the green column of homogenized material immediately as it issues from the apparatus 20, the homogenized plastic material may be stored in suitable containers and subsequently formed to any desired configuration.

As aforesaid, the foregoing improved products have been heretofore set forth and claimed in my said prior application Serial No. 610,422, and certain improved methods included in the foregoing have also been heretofore set forth and claimed in my aforesaid Patent No. 1,931,371.

The particular details and arrangement of the apparatus 20 as illustrated are those of an embodiment of the improved apparatus which has been actually constructed and operated for carrying out the particular improved methods of the present invention, and which has also been used in the making of said improved products of my said prior application Serial No. 610,422, and/or in the carrying out of certain steps in said improved methods of my said Patent No. 1,931,371.

The improved method of the present invention includes as aforesaid isolating a mass of plastic material from the normal atmosphere, moving the isolated mass, compressing the isolated moving mass into the form of a tube, expanding the isolated compressed moving tubular mass to longitudinally tear the same, rapidly disintegrating or comminuting preferably by transversely cutting, tearing or shredding the expanded and longitudinally torn isolated moving tubular mass into relatively small expanded pieces or shreds preferably having rough outside faces, preferably simultaneously subjecting the expanded, torn and comminuted pieces or shreds for a predetermined and relatively short period of time to an atmosphere isolated from the normal atmosphere and having a reduced pressure, preferably a vacuum of from 21 to 26 inches or higher of mercury, continuously moving said isolated atmosphere of reduced pressure away from the moving expanded, torn and comminuted pieces or shreds to the normal atmosphere thereby reducing and pumping away the gas content of the expanded, torn and comminuted pieces or shreds of plastic material, re-compressing the expanded, torn and comminuted pieces or shreds of plastic material having a reduced content to form a highly homogenized mass of the plastic material, and then moving the highly homogenized mass of plastic material into the normal atmosphere.

The expansion and tearing of the isolated compressed moving mass is preferably effected by forming a moving expanding and preferably flaring tubular column, and the comminuting or disintegrating is preferably effected by cutting, tearing or shredding the tubular column lengthwise and transversely.

The expanded, torn and comminuted pieces or shreds are preferably subject to the isolated moving atmosphere of reduced pressure for a period of time equal to that required for a free gravity fall in said atmosphere of at least 6 inches and preferably over 12 inches.

The above set forth improved method of producing highly homogenized plastic material is preferably carried out by the coordinated functioning of the parts and means of the improved apparatus of the present invention as typically embodied in the apparatus 20.

As illustrated, the pug mill 21, the first extrusion screw press 23, and the first sealing cylinder 24 are horizontally alined with each other, and have a common longitudinal horizontal axis 31. The second extrusion press 28 has a horizontal longitudinal axis 32, and is located below the alined pug mill 21, first extrusion press 23 and first sealing cylinder 24.

The wall portions 25 forming the vacuum chamber C—4 are interposed between the inner end 34 of the first sealing cylinder 24 and the inner end 35 of the second extrusion press 28, and the inner end 34 of the first sealing cylinder 24 is longitudinally spaced from the inner end 35 of the second extrusion press 28, and as aforesaid is also located above the second extrusion press 28, whereby material issuing from the first sealing cylinder 24 into the vacuum chamber C—4 will move horizontally by reason of the velocity imparted thereto by the action of the first extrusion press 23, and will simultaneously drop vertically by the action of gravity in the vacuum chamber C—4.

In order to permit pumping away of the desired maximum quantity of the gas content of the plastic material introduced into the vacuum chamber C—4, it has been discovered that the expanded and torn material after being comminuted or shredded by action of the comminuting or shredding apparatus 27, should have a free fall of at least 6 inches and preferably over 12 inches in the chamber C—4, when the pressure in the chamber C—4 has been reduced to a vacuum of from 21 to 26 inches or higher of mercury.

In other words, the torn and shredded or comminuted material should remain in the vacuum chamber C—4 having the reduced pressure as aforesaid, and from which the gases are being continuously pumped away for a period of time not less than that required for a free fall of at least 6 inches, in an atmosphere having a reduced pressure substantially equal to a vacuum of from 21 to 26 inches or higher of mercury.

In the illustrated embodiment of the improved apparatus, a frame indicated generally by 36 operatively mounts the several parts and means of the apparatus, which may include, in addition to those above set forth, a reduction gearing indicated diagrammatically at 37 and a drive pulley 38 which operatively drives the reduction gearing, and is driven from any suitable source of power, not shown, as by means of a belt 39.

The first extrusion press 23 includes a cantilever screw 40 whose bearing end 41 is connected with the adjacent end 42 of the pug mill blade shaft 43 and is preferably journalled therewith as by means of a bearing bracket 44.

The other end 45 of the pug mill blade shaft 43 extends beyond the pug mill housing 46 and is operatively connected with the reduction gearing 37 for being driven thereby, whereby the pug mill blade shaft 43 and the first extrusion press screw 40 are driven at the same speed.

The screw 47 of the second screw extrusion press 28 is likewise a cantilever screw and its bearing shaft 48 extends through the rear wall 25—1 of the vacuum chamber walls 25 and is journalled in a suitable pressure seal bearing 49 supported in the frame 36. The bearing shaft 48 extends beyond the bearing 49 towards the reduction gearing 37 and is provided with a driving connection therewith as by means of a coupling 50, whereby the screw 47 may be driven at a higher speed than the screw 40.

The pug mill 21 communicates with the first extrusion press 23 at the large end opening 51 of the internally tapered press walls 52 of the press 23, within which the screw 40 rotates in the usual manner.

The first screw press 23 communicates with the first plug seal forming chamber C—3 through the small end opening 54 of the tapered press walls 52.

The first plug seal forming chamber C—3 preferably communicates as aforesaid with the vacuum chamber C—4 through novel pressure relieving and preferably expanding and tearing annular orifice means indicated generally by 0.

The improved comminuting apparatus 27 operates to comminute or shed preferably by transversely cutting or tearing the longitudinally torn plastic material being processed through the apparatus immediately as it issues from the improved orifice 0.

The lower end of the vacuum chamber C—4 communicates with the second extrusion press 28 through the large end opening 56 of the internally tapered press walls 57 of the press 28, within which the screw 47 rotates in the usual manner.

The tapered press walls 57 of the second screw press 28 terminate in a small end opening 58 which communicates with the second plug seal forming chamber C—6.

The novel pressure relieving, expanding and tearing annular orifice means 0, as illustrated, is preferably removably secured to a preferably removable common wall 59 between the vacuum chamber C—4 and the first plug seal forming chamber C—3.

The wall 59 has a central discharge opening 60 formed therein, and the annular orifice means 0 preferably includes as illustrated an outer ring member 61 having an inner frusto-conical flaring or expanding surface 62 registering with the circular opening 60.

Preferably a conical flaring or expanding and tearing spreader member 63 is located in the opening of the ring member 61 and is mounted on the wall 59 as by means of a plurality of radially extending web and tearing bars 64.

As illustrated bolts and nuts 65 provide common means for securing the ring member 61 and the outer ends of the web bars 64 to the wall 59.

The base ends 66 and 67, respectively, of the internally frusto-conical ring member and the conical spreader member are located in the vacuum chamber C—4, and the apex 68 of the conical spreader member 63 is located well within the first plug seal forming chamber C—3, and as illustrated substantially midway longitudinally between the opening 54 and the opening 60.

The inner frusto-conical surface 62 of the ring member 61 has as illustrated a greater angle than the angle of the cone member 63, whereby the flaring or expanding and tearing annular opening 69 thus formed between the ring member 61 and the spreader member 63 has a transverse cross sectional area which increases as the opening approaches the vacuum chamber.

The vacuum chamber walls 25 preferably include a wall 25—2 located opposite the pressure relieving orifice means 0, and having a relatively large opening 25—3 formed therein, through which the wall 59 and parts attached thereto may be inserted and removed. A closure wall 25—4 is removably secured over the opening 25—3 to the wall 25—2 as by means of cap screws 70.

The closure wall 25—4 has a cylindric opening 25—5 formed therein and having its longitudinal axis coinciding with the axis 31.

The improved comminuting apparatus 27 includes an elongated tapered bearing housing 71 having an enlarged cylindric central portion 72 fitting in the opening 25—5, and having an external securing flange 73 by means of which the bearing housing 71 is secured to the closure wall 25—4 as by cap screws 74.

A shaft 75 extends through and is journalled in the housing 71 by pressure sealing journal means indicated generally by 76. The outer end of the shaft 75 has a sprocket 78 secured thereon, and the sprocket 78 is operatively connected by means of a chain 79 with a drive sprocket 80 secured on an auxiliary drive shaft 81 which is driven at a relatively high speed from the reduction gearing 37, the speed of rotation of the shaft 75 being preferably always substantially greater than the speed of rotation of the screw 40.

The inner end of the shaft 75 is located within the vacuum chamber C—4 and has secured thereon a shredder blade mounting hub 82, which is preferably formed at its outer end with a conical securing flange 83 which is angled reversely to the angle of the expanding opening 64.

One or more comminuting, cutting, shredding, or tearing blades 85 are secured to the flange 83, and are thus preferably angled with respect to the axis 31, and rotate across the base end of the expanding opening 64 in the vacuum chamber C—4.

The base ends 66 and 67, respectively, of the ring member 61 and spreader member 63, and the adjacent faces 86 of the web bars 64 preferably form frusto-conical seating and re-action surfaces across which the blades 85 are rotated.

The web bars 64 are preferably provided as illustrated with cutting or tearing edges 87 opposite the opening 60 and within the flaring, expanding and tearing annular opening 69.

Crane means indicated generally by 88 are preferably operatively mounted on the upper portions of the vacuum chamber forming walls 25 for facilitating installing and removing the various removable parts and members associated with the vacuum chamber.

The embodiment 20 of the improved apparatus operates to carry out the improved method as aforesaid.

The volume capacity of the apparatus is maintained equal to that of the other apparatus units in a production plant, by reason of the fact that the independently driven comminuting apparatus 27 may be provided with the necessary number of shredder blades and/or be driven at the necessary rate of speed, by changing sprockets, so that any particular kind of clay may be torn into shreds of sufficiently small size to permit a maximum reduction of the air content of the pieces or shreds during their relatively rapid rate of flow through the vacuum chamber.

The operation of the apparatus requires a relatively small amount of additional power over that of a similar apparatus not provided with the expanding, tearing and comminuting means.

It will be noted that the total length of the first seal plug formed may be adjusted to suit the requirements of the particular material being processed, by varying the location of the apex of the spreader member 63.

In Fig. 7, a modified embodiment of the apparatus 20 is indicated generally by 120, and is generally similar to the apparatus 20, but is provided at each side of the interior of the vacuum chamber C—4, with a stretched rubber wall 121 which is spaced from the metallic side walls of the vacuum chamber, and which serves to prevent sticking of the shreds or pieces of expanded and torn material as they drop in the vacuum chamber or are drawn by the tearing blades to one side and the other, and also serves as a resilient rebound wall.

In Fig. 8, a modified embodiment of the improved apparatus is indicated generally at 220, and is in the form of a machine adapted for making sewer pipe.

In the operation of the improved apparatus, the compression of the partially pugged clay in the throat of the die leading from the first plug seal forming chamber into the vacuum chamber, squeezes out some of the free air, which is passed back through the partially pugged clay, but leaves enough free air in the partially pugged clay, so that the entrained or occluded air prevents the desired intimate contact between particles or granules of the partially pugged clay.

When the clay is in this condition, the outward tapering of the conical core or spreader member in or beyond the mouth of the die, so enlarges the diameter and circumference of the tubular clay column, that the body and surfaces of the clay are torn and separate on radial and transverse lines so as to break open the surfaces and break up or granulate the body of the clay to such an extent, that some granules, at least, will drop away from the clay column before being impinged by the shredding devices.

The skin surfaces of an extruded clay column do not unite as readily as raw surfaces of the clay, so that it is desirable to reduce the skin surfaces to a minimum area or ratio as compared with the raw surfaces, to permit as complete degasification as possible and render more effective the subsequent recompression to form a homogeneous mass; and in the improved apparatus the same is accomplished by cutting or shredding the torn tubular clay column into very thin slices by a very rapid rotation of the cutting or shredding means, as it leaves the flaring orifice or die from the first plug seal forming chamber into the vacuum chamber.

I claim:

1. In the method of homogenizing plastic materials and the like, the steps of isolating a mass of plastic material from one atmosphere, compressing the isolated mass into a tubular form, expanding and tearing the isolated compressed tubular mass, comminuting the expanded and torn isolated tubular mass into expanded and torn pieces, and subjecting the comminuted expanded and torn pieces into a second atmosphere isolated from the first atmosphere and having a pressure reduced from that of the first atmosphere.

2. Apparatus for homogenizing plastic materials and the like, including means for isolating a mass of plastic material from one atmosphere, means for shaping the isolated mass into a tubular form, and expanding and tearing the isolated tubular mass, means for comminuting the expanded and torn isolated tubular mass into expanded and torn pieces, and means for subjecting the comminuted expanded and torn pieces into a second atmosphere isolated from the first atmosphere and having a pressure reduced from that of the first atmosphere.

3. The method of homogenizing plastic materials and the like, which includes isolating a mass of plastic material from one atmosphere, compressing the isolated mass into a tubular form, expanding and tearing the isolated compressed tubular mass, comminuting the expanded and torn isolated tubular mass into expanded and torn pieces, subjecting the comminuted expanded and torn pieces to a second atmosphere isolated from the first atmosphere and having a pressure reduced from that of the first atmosphere, pumping the isolated atmosphere of reduced pressure away from the expanded and torn pieces to the first atmosphere thereby reducing and pumping away the gas content of the expanded and torn pieces, and re-compressing the expanded and torn pieces having a reduced gas content to form a homogenized mass of the plastic material.

4. The method of homogenizing plastic materials and the like, which includes isolating a mass of plastic material from one atmosphere, forming, expanding and tearing a tubular column from the isolated mass, comminuting the isolated tubular expanded and torn column into pieces, subjecting the pieces to a second atmosphere isolated from the first atmosphere and having a pressure reduced from that of the first atmosphere, pumping the isolated atmosphere of reduced pressure away from the comminuted pieces to the first atmosphere thereby reducing and pumping away the gas content of the pieces, and re-compressing the pieces having a reduced gas content to form a homogenized mass of the plastic material.

5. Apparatus for homogenizing plastic materials and the like, including means for isolating a mass of plastic material from one atmosphere, means for shaping the isolated mass into a tubular form, and expanding and tearing the isolated tubular mass, means for comminuting the expanded and torn isolated tubular mass into expanded and torn pieces, means for subjecting the comminuted expanded and torn pieces to a second atmosphere isolated from the first atmosphere and having a pressure reduced from that of the first atmosphere, means for pumping the isolated atmosphere of reduced pressure away from the expanded and torn pieces to the first atmosphere thereby reducing and pumping away the gas content of the expanded and torn pieces, and means for re-compressing the expanded and torn pieces having a reduced gas content to form a homogenized mass of the plastic material.

6. Apparatus for homogenizing plastic materials and the like, including means for isolating a mass of plastic material from one atmosphere, means for shaping the isolated mass into a tubular form, and expanding and tearing the isolated tubular mass, means for comminuting the expanded and torn isolated tubular mass into expanded and torn pieces, means for subjecting the comminuted expanded and torn pieces to a second atmosphere isolated from the first atmosphere and having a pressure reduced from that of the first atmosphere, means for pumping the isolated atmosphere of reduced pressure away from the expanded and torn pieces to the first atmosphere thereby reducing and pumping away the gas content of the expanded and torn pieces, and means for re-compressing the expanded and torn pieces having a reduced gas content to form a homogenized mass of the plastic material, and means for introducing the homogenized mass of plastic material into the first atmosphere.

7. Apparatus for homogenizing plastic materials and the like, including means for isolating a mass of plastic material from one atmosphere, means for forming, expanding and tearing a tubular column from the isolated mass, means for comminuting the isolated tubular expanded and torn column into pieces, means for subjecting the pieces to a second atmosphere isolated from the first atmosphere and having a pressure reduced from that of the first atmosphere, means for pumping the isolated atmosphere of reduced pressure away from the comminuted pieces to the first atmosphere thereby reducing and pumping away the gas content of the pieces, and means for re-compressing the pieces having a reduced gas content to form a homogenized mass of the plastic material.

8. Apparatus for homogenizing plastic materials and the like, including means for isolating a mass of plastic material from one atmosphere, means for forming, expanding and tearing a tubular column from the isolated mass, means for comminuting the isolated tubular expanded and torn column into pieces, means for subjecting the pieces to a second atmosphere isolated from the first atmosphere and having a pressure reduced from that of the first atmosphere, means for pumping the isolated atmosphere of reduced pressure away from the comminuted pieces to the first atmosphere thereby reducing and pumping away the gas content of the pieces, and means for re-compressing the pieces having a reduced gas content to form a homogenized mass of the plastic material, and means for introducing the homogenized mass of plastic material into the first atmosphere.

LOUIS C. BONNOT.